US008080495B2

(12) United States Patent
Oljaca et al.

(10) Patent No.: US 8,080,495 B2
(45) Date of Patent: Dec. 20, 2011

(54) DIESEL OXIDATION CATALYSTS (75) Inventors: Miodrag Oljaca, Albuquerque, NM (US); Ranko P Bontchev, Albuquerque, NM (US); Paolina Atanassova, Albuquerque, NM (US); Berislav Blizanac, Albuquerque, NM (US); Yipeng Sun, Albuquerque, NM (US); Matthew Ezenyilimba, Sandia Park, NM (US); George Fotou, Albuquerque, NM (US); Kenneth Koehlert, Albuquerque, NM (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 12/851,869

(22) Filed: Aug. 6, 2010

(65) Prior Publication Data
US 2011/0245073 A1 Oct. 6, 2011

Related U.S. Application Data (63) Continuation of application No. PCT/US2010/029634, filed on Apr. 1, 2010.

(51) Int. Cl.
*B01J 23/00* (2006.01)
*B01J 21/00* (2006.01)
*B01J 20/00* (2006.01)
*C22C 38/00* (2006.01)
*C22C 5/04* (2006.01)
*H01M 4/00* (2006.01)

(52) U.S. Cl. ........ 502/339; 502/185; 502/304; 502/327; 502/328; 502/332; 502/333; 502/334; 502/349; 502/415; 502/439; 420/82; 420/465; 429/524; 429/525; 429/532; 429/533; 977/773; 977/810

(58) Field of Classification Search .................. 502/185, 502/304, 327, 328, 332, 333, 334, 339, 349, 502/415, 439; 977/773, 810; 420/82, 465; 429/524, 525, 532, 533
See application file for complete search history.

(56) References Cited

U.S. PATENT DOCUMENTS

| | | | |
|---|---|---|---|
| 4,536,482 A * | 8/1985 | Carcia | 502/5 |
| 5,128,114 A | 7/1992 | Schwartz et al. | |
| 5,208,207 A * | 5/1993 | Stonehart et al. | 502/339 |
| 5,439,865 A * | 8/1995 | Abe et al. | 502/333 |

(Continued)

FOREIGN PATENT DOCUMENTS

EP 2070581 A1 6/2009

(Continued)

OTHER PUBLICATIONS

International Search Report and the Written Opinion of the International Searching Authority issued in the corresponding PCT/US2010/029634 mailed Jul. 30, 2010.

(Continued)

*Primary Examiner* — Cam N. Nguyen
(74) *Attorney, Agent, or Firm* — Roberts Mlotkowski Safran & Cole, P.C (57) ABSTRACT

A catalyst composition comprises a particulate support and catalyst nanoparticles on the particulate support. The catalyst nanoparticles comprise an alloy of platinum and palladium in an atomic ratio of from about 25:75 to about 75:25 and are present in a concentration of between about 3 and about 10 wt % weight percent of the catalyst composition. The catalyst composition has an X-ray diffraction pattern that is substantially free of the (311) diffraction peak assignable to $Pt_xPd_{1-x}$, where $0.25 \leq x \leq 0.75$.

29 Claims, 8 Drawing Sheets

U.S. PATENT DOCUMENTS

| | | | |
|---|---|---|---|
| 6,030,921 A * | 2/2000 | Ziemer | 502/325 |
| 6,103,393 A | 8/2000 | Kodas et al. | |
| 6,147,027 A * | 11/2000 | Miyake et al. | 502/325 |
| 6,159,267 A | 12/2000 | Hampden-Smith et al. | |
| 6,165,247 A | 12/2000 | Kodas et al. | |
| 6,284,402 B1 * | 9/2001 | Mallouk et al. | 429/524 |
| 6,338,809 B1 | 1/2002 | Hampden-Smith et al. | |
| 6,602,820 B1 | 8/2003 | Göbel et al. | |
| 6,649,300 B2 * | 11/2003 | Ito et al. | 429/487 |
| 6,660,680 B1 | 12/2003 | Hampden-Smith et al. | |
| 6,682,837 B2 * | 1/2004 | Gorer | 429/422 |
| 6,689,505 B1 * | 2/2004 | Albers et al. | 429/480 |
| 6,861,387 B2 * | 3/2005 | Ruth et al. | 502/184 |
| 6,991,754 B2 | 1/2006 | Hampden-Smith et al. | |
| 6,995,114 B2 * | 2/2006 | Gorer | 502/325 |
| 7,060,385 B2 * | 6/2006 | Kato et al. | 429/524 |
| 7,066,976 B2 | 6/2006 | Hampden-Smith et al. | |
| 7,109,145 B2 * | 9/2006 | Ruth et al. | 502/326 |
| 7,384,889 B2 * | 6/2008 | Ito | 502/327 |
| 7,455,712 B2 * | 11/2008 | Sato | 75/255 |
| 7,485,390 B2 * | 2/2009 | Devenney et al. | 429/524 |
| 7,507,687 B2 | 3/2009 | Kodas et al. | |
| 7,576,031 B2 * | 8/2009 | Beutel et al. | 502/339 |
| 7,595,108 B2 * | 9/2009 | Perez et al. | 428/403 |
| 7,713,910 B2 * | 5/2010 | Goia et al. | 502/326 |
| 7,799,425 B2 * | 9/2010 | Chikamori et al. | 428/403 |
| 7,820,291 B2 * | 10/2010 | Kim et al. | 428/403 |
| 7,875,250 B2 * | 1/2011 | Nunan | 422/177 |
| 7,875,573 B2 * | 1/2011 | Beutel et al. | 502/339 |
| 2002/0009626 A1 * | 1/2002 | Terazono et al. | 429/30 |
| 2005/0101481 A1 * | 5/2005 | Ruth et al. | 502/325 |
| 2006/0162497 A1 | 7/2006 | Kodas et al. | |
| 2006/0183636 A1 | 8/2006 | Klein et al. | |
| 2007/0037696 A1 * | 2/2007 | Gorer et al. | 502/177 |
| 2007/0160899 A1 | 7/2007 | Atanassova et al. | |
| 2007/0227300 A1 * | 10/2007 | McGrath et al. | 75/255 |
| 2008/0014494 A1 * | 1/2008 | Iordache et al. | 429/40 |
| 2008/0193370 A1 | 8/2008 | Hampden-Smith et al. | |
| 2008/0226958 A1 | 9/2008 | Sun et al. | |
| 2009/0317289 A1 * | 12/2009 | Ito et al. | 420/461 |
| 2009/0325792 A1 | 12/2009 | Oljaca et al. | |
| 2010/0152031 A1 * | 6/2010 | Borchtchoukova et al. | 502/185 |
| 2010/0190641 A1 * | 7/2010 | Goia et al. | 502/326 |
| 2011/0091787 A1 * | 4/2011 | McGrath et al. | 429/479 |
| 2011/0173959 A1 * | 7/2011 | Fisher et al. | 60/297 |

FOREIGN PATENT DOCUMENTS

| | | |
|---|---|---|
| WO | 9204976 A1 | 4/1992 |

OTHER PUBLICATIONS

Reto Strobel et al: "Flame-made Alumina Supported Pd-Pt Nanoparticles: Structural Properties and Catalytic Behavior in Methane Combustion" Catalysis Letters, Kluwer Academic Publishers-Plenum Publishers, NE, vol. 104, No. 1-2, Oct. 1, 2005, pp. 9-16.

Hannemann et al: "Combination of Flame Synthesis and High Throughput Experimentation: Preparation of Alumina Supported Noble Metal Particles and Their Application in the Catalytic Partial Oxidation of Methane", Applied Catalysis A: General, Elsevier Science, Amsterdam, NL vol. 316, No. 2, Dec. 8, 2006, pp. 226-239.

Strobel, Reto; Pratsinis, Sotiris E.: "Flame Synthesis of Supported Platinum Group Metals for Catalysis and Sensors"; Platinum Metals Review, vol. 53., 2009, pp. 11-20, London.

* cited by examiner

DIESEL OXIDATION CATALYSTS

CROSS REFERENCE TO RELATED APPLICATIONS

This application claims the benefit of the filing date of International Application No. PCT/US2010/029634 filed Apr. 1, 2010.

FIELD

This invention relates to diesel oxidation catalysts, their production and use.

BACKGROUND

In vehicles with diesel engines, an oxidation catalyst is typically used to reduce the level of carbon monoxide, nitrous oxide and unburnt hydrocarbons present in the engine exhaust gas. Early diesel oxidation catalysts were composed of platinum on a high surface area support, such as alumina, and were generally operated at temperatures up to 500 to 600° C. More recently, diesel oxidation catalysts have been required to operate at higher temperatures, typically of the order of 700 to 800° C., in order to regenerate the particulate filter that is conventionally located downstream of the oxidation catalyst. It is known that mixed platinum and palladium catalysts offer improved thermal stability as compared with platinum alone and hence the catalyst industry has shifted almost completely to PtPd-based diesel oxidation catalysts. However, currently available Pt/Pd-based oxidation catalysts suffer from the problems of poor alloying between the platinum and palladium and a tendency for the size of the metal particles to grow both as the platinum concentration is increased and during use. Both of these factors limit the performance of the catalyst and the possibility for further enhancements in thermal stability.

There is therefore significant interest in developing diesel oxidation catalysts with improved properties and particularly with improved initial activity, improved thermal stability, controlled and stable metal particle size and reduced aging.

According to the present invention, a novel supported Pt/Pd alloy catalyst has now been produced in which the metal alloy particles exhibit a unique combination of small size, controlled and uniform shape, homogeneous dispersion and high surface area.

SUMMARY

In one aspect, the invention resides in a catalyst composition comprising support particles; and catalyst nanoparticles on the support particles, the catalyst nanoparticles comprising an alloy of platinum and palladium in an atomic ratio of from about 25:75 to about 75:25 and being in a concentration of between about 3 and about 10 wt. % weight percent of the catalyst composition, and the catalyst composition having an X-ray diffraction pattern that is substantially free of the (311) diffraction peak assignable to $Pt_xPd_{1-x}$, where $0.25 \leq x \leq 0.75$.

Conveniently, the catalyst composition has an X-Ray diffraction pattern that is substantially free of the (202, 211) diffraction peaks assignable to PdO.

Conveniently, the surface area of the catalyst nanoparticles as measured by CO pulsed chemisorption is greater than 100 $m^2/g$ of the platinum and palladium in the catalyst composition.

In another aspect, the invention resides in a catalyst composition comprising support particles; and catalyst nanoparticles on the support particles, the catalyst nanoparticles comprising platinum and palladium in an atomic ratio of from approximately 25:75 to approximately 75:25 and being in a concentration of approximately 5 and 10 weight percent of the composition, and the catalyst composition having a metal surface area as measured with CO pulsed chemisorption of at least 100 $m^2/g$ of the platinum and palladium in the catalyst composition.

In a further aspect, the invention resides in a catalyst composition comprising support particles; and catalyst nanoparticles on the support particles, the catalyst nanoparticles comprising platinum and palladium in an atomic ratio of from approximately 25:75 to approximately 75:25 and being in a concentration of approximately 5 and 10 weight percent of the composition, wherein the catalyst composition, after being heated in air flowing at 100 ml/min from 25° C. to 800° C. at 10° C./minute and then held at 800° C. for 16 hours in said flowing air, exhibits a metal surface area as measured with CO pulsed chemisorption of at least 18 $m^2/g$, and generally at least 20 $m^2/g$, of the platinum and palladium in the catalyst composition.

Conveniently, the support particles have an average diameter, d50, of less than 100 microns. In one embodiment, the support particles have an average diameter, d50, of about 5 to about 50 microns. In another embodiment, the support particles have an average diameter, d50, of about 1 to about 10 microns.

Conveniently, the catalyst nanoparticles have an average diameter of less than 10 nm, such about 1 to about 5 nm.

Conveniently, the support particles are formed of a refractory inorganic oxide material, particularly comprising at least one alumina, ceria, zirconia, and magnesia.

In one embodiment, the support particles are formed of alumina and have a surface area (BET) in the range of about 50 to about 350 $m^2/g$.

In yet a further aspect, the invention resides in a process of producing the catalyst composition described herein.

DETAILED DESCRIPTION OF THE EMBODIMENTS

Described herein is catalyst composition suitable for use as a diesel oxidation catalyst. The catalyst composition comprises a particulate support on which are deposited catalyst nanoparticles comprising an alloy of platinum and palladium in an atomic ratio of from about 25 (Pt):75 (Pd) to about 75 (Pt):25 (Pd), more typically in an atomic ratio of from about 35 (Pt):65 (Pd) to about 65 (Pt):35 (Pd), for example in an atomic ratio of from about 45 (Pt):55 (Pd) to about 55 (Pt):45 (Pd). In one preferred embodiment, the Pt and Pd are in a 50:50 atomic ratio.

The catalyst nanoparticles are present on the support particles in an amount between about 3 and about 10 wt % weight percent, typically between about 3 and about 7 wt % weight percent, such as between about 4 and about 6 wt % weight percent of the catalyst composition. The catalyst nanoparticles are present on the support particles as highly dispersed, nano-sized crystals such that, in one preferred embodiment, the surface area of the catalyst nanoparticles, as measured by CO pulsed chemisorption of at least 100 m²/g, for example at least 110 m²/g, of the platinum and palladium in the catalyst composition. Generally, catalyst surface areas values, as measured by CO pulsed chemisorptions, up to or even exceeding 180 m²/g can be obtained. Typically, the catalyst nanoparticles have an average diameter of less than 10 nm, such about 1 to about 5 nm.

In another embodiment, the small size and high dispersion of the catalyst nanoparticles is evident from the characteristic X-ray diffraction pattern the catalytic composition in that the diffraction pattern is substantially free of the (311) diffraction peak assignable to $Pt_xPd_{1-x}$, where $0.25 \leq x \leq 0.75$. In this respect the term "substantially free" means that the integral intensity of the (311) $Pt_xPd_{1-x}$ peak is less than 10% of the (331) X-ray diffraction peak of a 200 mesh silicon standard. In addition, the X-ray diffraction pattern is normally substantially free of the (202, 211) diffraction peaks assignable to PdO, again such that the integral intensity of the (202+211) PdO peaks is less than approximately 10% of the (331) X-ray diffraction peak of a 200 mesh silicon standard.

Typically, the support particles have an average diameter, d50, of less than 100 microns. In one embodiment, the support particles have an average diameter, d50, of about 5 to about 50 microns. In another embodiment, the support particles have an average diameter, d50, of about 1 to about 10 microns.

The nature of particulate support can vary widely although the support must be able to withstand the conditions employed by the catalyst in use in a diesel engine. Generally, therefore the support particles are formed of a refractory inorganic oxide material, such as alumina, ceria, and zirconia. Aluminates and mixed metal oxides, such as alumina modified with ceria, zirconia, magnesia, and other base metal oxides, are also suitable support materials. In one practical embodiment, the support particles are formed of alumina having a surface area (BET) in the range of about 50 to about 350 m²/g.

The powder batch described herein is produced by a high temperature spray conversion process. In this approach, a precursor medium is produced which comprises a precursor to at least one of the components of the powder batch dissolved or suspended in a liquid carrier, while the remaining components, if any, of the powder batch are dispersed as particles in the liquid carrier. The precursor medium carrier is then atomized to produce an aerosol comprising droplets dispersed and suspended in a carrier gas. The aerosol is then heated at a temperature of at least 200° C. in order to: (1) remove at least a portion of the liquid carrier in the droplets; and (2) convert the or each precursor to the corresponding component of the powder batch.

By the term "precursor" is meant any compound capable of being chemically converted under the conditions employed in the spray conversion process to at least one component of the final powder batch. Suitable precursors therefore include inorganic salts of the elements contained in the powder batch, such as nitrates, sulfates and chlorides, as well as organic complexes of elements, such as tetra amine platinum and palladium complexes.

Depending on the temperature required to convert each precursor, the conversion may take place in a spray conversion reactor (which is generally operable at conversion temperatures between about 200° C. and about 600° C.), a spray pyrolysis reactor (which is generally operable at conversion temperatures between about 500° C. and about 1500° C.) or a flame spray reactor (operable at conversion temperatures between about 1200° C. and about 3000° C.). Generally, it is preferred to operate the spray conversion process at a temperature of from about 400° C. to about 1000° C., so that flame spray techniques are not preferred.

Conveniently, the precursor medium is produced by dissolving a soluble precursor to one or preferably both catalytically active metals, for example platinum nitrate and palladium nitrate, in a liquid carrier, such as water, while pre-made particles of the support material, for example fumed or precipitated alumina, are dispersed in the liquid carrier. Alternatively, soluble precursor(s) to the support material can be dissolved in the liquid carrier in addition to the precursor to the catalytically active material. As a further alternative, it is possible to modify the composition of the support material during the spray conversion process, for example by starting with pre-made support particles and including in the liquid carrier a precursor to a support modifying material. In this way the final support is a combination of the pre-made support particles and the support modifying material. An example of such a modifying material would be an oxide material effective to limit sintering of the support material in use and hence to increase the thermal stability of the catalyst composition.

In addition, it is possible to produce a precursor medium in which solid particles of at least one of catalytically active metals are dispersed in the liquid carrier, whereas soluble precursor(s) to the support material are dissolved in the liquid carrier. Alternatively, the or each precursor to a component of the powder batch can be present in the carrier liquid as micron or sub-micron sized particles suspended in the liquid. Also, where the precursor medium comprises solid particles of at least one component of the final powder batch, it is possible to produce said solid particles by an initial vapor phase, spray conversion process, such as flame spraying, in which a precursor to said at least one component is chemically converted in the vapor phase to produce said solid particles.

The support material used may be in the form of a fumed powder with high outer porosity or in the form of a precipitated powder formed by liquid methods with preferentially high internal surface area. It is also possible to mill the support particles, either in powder or slurry form, to reduce the particle size of the initial support particles and thereby control the morphology and pore size of the final catalyst composition. For example, in one embodiment, using fumed alumina or milled precipitated alumina having an initial particle size of less than 1 micron in the precursor medium, spray conversion typically yields support particles in the form of spherical agglomerates with an average diameter, d50, of about 1 to about 10 microns. In an alternative embodiment, using unmilled precipitated alumina which typically has an initial particle size, d50, of 5 to 50 microns in the precursor medium, spray conversion typically produces support particles with the original particle size but with an irregular morphology.

Generally, where the precursor medium contains solid particles of at least one component of the final powder batch, the solid particles are arranged to have a particle size of between about 0.1 micron and about 100 micron, such as between about 1 micron and about 10 micron.

The components of the precursor medium are selected to achieve a balance between dispersion of the catalytically active metals and alloying. For example, precursors to the catalytically active particles may interact with the support surface through ion exchange, anchoring, grafting, or deposition-precipitation among others. In addition, adsorption of metal complexes on the support may result from electrostatic interactions or from direct chemical reactions, with the degree of adsorption depending either on the electric charge of the precursor species or on its chemical reactivity. Both mechanisms can be affected by the pH of the liquid carrier and the state of the support surface. For example, in a single step process, the pH of the liquid carrier can be adjusted to provide either non-selective ion exchange (equal adsorption of both Pt and Pd precursors) or selective ion exchange (adsorption of Pd without adsorption of Pt).

One convenient route to facilitate alloying is preparation of heterobinuclear complexes that start with a 1:1 ratio of Pt:Pd in each molecule. This can be achieved using complexing agents such as EDTA or citric acid. These complexes adsorb or deposit on the support surface and ensure intimate mixing of Pt and Pd in the desirable 1:1 ratio. Another route to facilitate alloying is to pre-react the Pt and Pd precursors to form alloy nanoparticles and use the reactive spray process to uniformly deposit the alloy nanoparticles on the support. Precursors to Pd and Pt can be reduced to metal in the precursor slurry and the resulting alloy nanoparticles will deposit onto the support when spray-processed.

In addition, a two-step process may be used to pre-adsorb or deposit one metal precursor on the support then adsorb or deposit the second metal with a goal of stacking the metals and ensuring they are in close proximity. One approach is to adsorb one metal precursor onto the support from the liquid carrier, then add the second metal precursor prior to spray processing. Another approach is to deposit one metal (either Pt or Pd) onto the support using spray processing then collect the resulting powder batch, make a second precursor slurry containing the first powder batch and the second metal precursor and finally process the slurry to form the Pt—Pd catalytic particles on the support.

Metal precursors also differ in decomposition profile, both temperature and mechanism. Precursors and process conditions can be selected to avoid passing through a metal oxide phase and to decompose directly to the metal. For example, thermogravimetric analysis in air shows that tetramine complexes of Pt decompose directly to Pt at temperatures less than 300° C. while $Pt(NO_3)_2$ decomposes first to $PtO_2$ then to Pt metal at about 600° C. This difference can be exploited to change the deposition and alloying behavior of the catalytic nanoparticles.

Other additives can be included in the precursor medium to perform other functions, for example: modifying the support material to improve thermal stability; inducing reaction of the precursors to the catalytically active metal; and modifying the interaction of the support and precursor to influence adsorption.

The liquid carrier can be inorganic, organic, or an inorganic/organic mixture. Some non-limiting examples of suitable inorganic liquids include water and aqueous solutions, which may be pH neutral, acidic or basic.

Some non-limiting examples of organic liquid vehicles include alcohols (e.g., methanol, ethanol, isopropanol, butanol), organic acids, glycols, aldehydes, ketones, ethers, waxes, or fuel oils (e.g., kerosene or diesel oil). The liquid carrier may include a mixture of mutually soluble liquid components, such as a mixture of mutually soluble organic liquids or a mixture of water with one or more organic liquids that are mutually soluble with water (e.g., some alcohols, ethers, ketones, aldehydes, etc.). Alternatively, the liquid vehicle may contain multiple distinct liquid phases, for example, an emulsion, such as an oil-in-water or a water-in-oil emulsion. Water is the preferred carrier.

Where the precursor medium is introduced into the spray conversion reactor as an aerosol, the aerosol can be produced using any suitable device that disperses liquid into droplets, such as for example, a spray nozzle. Examples of suitable spray nozzles include ultrasonic spray nozzles, multi-fluid spray nozzles and pressurized spray nozzles. Ultrasonic spray nozzles generate droplets of liquid by using piezoelectric materials that vibrate at ultrasonic frequencies to break up a liquid into small droplets. Pressurized nozzles use pressure and a separator or screen in order to break up the liquid into droplets. In some cases, pressurized nozzles may involve use of some vapor that is generated from the liquid itself in order to pressurize and break up the liquid into droplets. One advantage of using ultrasonic and pressurized nozzles is that an additional fluid is not required to generate liquid droplets. This may be useful in situations where the precursor dissolved in the liquid vehicle is sensitive and/or incompatible with other common fluids used in multi-fluid spray nozzles.

In addition to the use of a spray nozzle for dispersing the liquid medium, any other suitable device or apparatus for generating disperse droplets of liquid may be used. One example of a device that is useful in generating droplets of liquid is an ultrasonic generator. An ultrasonic generator uses transducers to vibrate liquids at very high frequencies which break up the liquid into droplets. One example of an ultrasonic generator that is useful in the present process is disclosed in U.S. Pat. No. 6,338,809, incorporated herein by reference in its entirety. Another example of a device that is useful in generating droplets of liquid is a high energy atomizer such as those used in carbon black production.

Generally, whatever method is employed to atomize the precursor medium, the aerosol produced is arranged to have an average droplet size between about 1 and about 100 microns, such as between about 3 and about 50 microns, for example between about 5 and about 30 micron. In certain cases, it may be desirable to introduce one or more precursors and/or components of the final powder batch to the spray conversion reactor as dry powders.

When the precursor medium is introduced into the spray conversion reactor as an aerosol in a liquid vehicle, the aerosol droplets are conveniently dispersed in a carrier gas. The carrier gas may include any combination of gas components in any concentrations. In addition, the gas phase may include only components that are inert (i.e. nonreactive) in the reactor or the gas phase may comprise one or more reactive components (i.e., which decompose or otherwise react in the reactor). For example, gases such as nitrogen and hydrogen/nitrogen mixtures can be included in the carrier gas to increase its reductive potential. In addition, when the spray conversion is conducted in a flame reactor, the carrier gas may comprise a gaseous fuel and/or oxidant for combustion in the flame. Non-limiting examples of suitable gaseous oxidants are gaseous oxygen (which could be provided by making the gas phase from or including air) and carbon monoxide. Non-limiting examples of gaseous fuels that could be included in the carrier gas include hydrogen gas and gaseous organics, such as hydrocarbons (e.g., methane, ethane, propane, butane).

In one embodiment, the spray conversion step is conducted in a high temperature spray drier, in which the atomized precursor medium is contacted with a stream of a heated drying gas, generally air. High temperature spray driers typically operate at temperatures between about 300° C. and about 600° C. One suitable spray drier reactor is disclosed in U.S. Pat. No. 6,991,754, the entire contents of which are incorporated herein by reference.

In another embodiment, the spray conversion step is conducted in a spray pyrolysis reactor in which the droplets of the precursor medium are transported by the carrier gas through a furnace, typically a tubular furnace, maintained at a temperature of from about 500° C. to about 1500° C., such as in the range of from about 600° C. to about 1100° C. One suitable spray pyrolysis reactor is disclosed in U.S. Pat. No. 6,338,809, the entire contents of which are incorporated herein by reference.

In a further embodiment, the spray conversion step is conducted in a flame reactor. By a "flame reactor" is meant a reactor having an internal reactor volume directly heated by one or more than one flame when the reactor is operated. By "directly heated" is meant that the hot discharge of a flame flows into the internal reactor volume. By the term "flame" is meant a luminous combustion zone. One suitable flame reactor is disclosed in U.S. Patent Application Publication No. 2006/0162497, published on Jul. 27, 2006, the entire contents of which are incorporated herein by reference. Using a flame reactor, conversion temperatures in excess of 1000° C., such as from about 1200° C. to about 3000° C. can be attained.

It will be appreciated that the type of spray conversion process used to produce any given powder batch will depend on a number of factors, including the temperature required to convert the precursor compound(s) in the precursor medium to the desired component or components of the final catalyst.

In the spray conversion process, at least part of the liquid carrier is removed from the droplets of the precursor medium and the precursor compound(s) present in the precursor medium are chemically converted to the corresponding component(s) of the powder batch. As a result, a composite powder condenses from the precursor medium and can be recovered from the carrier gas by any convenient particle collection apparatus, such as a filter. Depending on the temperature of the spray conversion process, a quenching medium may be used to assist in cooling and condensation of the powder product so as to restrict growth of the catalyst particles. Generally the residence time of the precursor medium in the spray conversion reactor, prior to any quenching, is less than 60 seconds, such as less than 30 seconds. Actual residence times vary according to the type and temperature of the spray conversion process. Thus with a spray drier operating at about 300° C. to about 600° C., suitable residence times are from about 10 to about 60 seconds; whereas with a spray pyrolysis reactor operating at about 600° C. to about 1100° C., suitable residence times are from about 1 to about 10 seconds. In the case of a flame reactor operating in excess of 1100° C. to about 3000° C., suitable residence times are from about 0.01 to about 1 second.

The powder batch produced by the spray conversion process described above may be used directly as an exhaust treatment catalyst or may initially be subjected to one or more post-treatments to improve its catalytic activity or otherwise change its composition. Suitable post-treatments include further heating in air or reducing environment at room temperature or elevated temperature, milling, size classification, surface modification and other treatments know to those skilled in art.

In one embodiment, the powder batch is subjected to a post treatment to improve alloying of the Pt and Pd components, typically by heating the powder batch at a temperature between about 100° C. and about 500° C. in an inert or reducing atmosphere for about 2 hours to about 10 hours. A suitable reducing atmosphere comprises a mixture of nitrogen and hydrogen, for example a mixture of nitrogen and hydrogen comprising up to 50 vol. %, such as up to 10 vol. %, hydrogen.

The present powder batch may be used as a diesel oxidation catalyst without the provision of a support or may be supported on a substrate. In one embodiment, the substrate is in the form of beads or pellets, which may be formed from alumina, silica alumina, silica, titania, mixtures thereof, or any suitable material. In another embodiment, the substrate is a honeycomb support, which may be a ceramic honeycomb support or a metal honeycomb support. Suitable ceramic materials for the support include sillimanite, zirconia, petalite, spodumene, magnesium silicates, silicon carbide, mullite, alumina, mullite, cordierite, other alumino-silicate materials, or combinations thereof. Other ceramic and metallic supports such as reticulated foams are also suitable. Preferably, the substrate support, whether metallic or ceramic, offers a three-dimensional support structure.

When used as diesel oxidation catalyst, the catalyst composition described herein shows reduced aging as compared to a catalyst of similar composition produced by conventional wet chemistry techniques. In particular, the present catalyst composition, after being heated in air flowing at 100 ml/min from 25° C. to 800° C. at 10° C./minute and then held at 800° C. for 16 hours in said flowing air, exhibits a metal surface area as measured with CO pulsed chemisorption of at least 18 m$^2$/g, and generally at least 20 m$^2$/g, of the platinum and palladium in the catalyst composition. In contrast a similar composition produced by conventional wet chemistry techniques, when subjected to the same aging test, would exhibit a metal surface area as measured with CO pulsed chemisorption of 15 m$^2$/g or less of the platinum and palladium in the catalyst composition.

The invention will now be more particularly described with reference to the following non-limiting Examples and the accompanying drawings.

In the Examples, all samples used for X-ray examination are prepared by combining 0.4000(5) g of the powdered catalyst and 0.1000(5) g of a 200 mesh Si standard, mixing the combination thoroughly by shaking in a closed vial and then transferring and pressing the mixture flat in a standard diffractometer holder.

X-ray analyses are performed on a Bruker AXS D8 advance X-Ray diffractometer using Ni monochromated Cu—K$\alpha$ radiation, a power setting of 40 kV and 30 mA, a divergence slit of 1°, an antiscattering slit of 1°, a scanning interval of 70.0 to 84.0 degrees 2θ, a step of 0.02 degrees 2θ, and a collection time 8 seconds per step.

Bruker EVA software was used to calculate a) the background correction for all samples, b) subtract the intensity due to Cu—K$\alpha_2$ radiation, c) measure the Pt$_x$Pd$_{1-x}$ and/or PdO and Si integral intensities (cps.deg), and d) calculate the I(Pt$_x$Pd$_{1-x}$ or PdO)/I(Si) ratio.

CO pulsed chemisorption data referred to herein are obtained using a Micromeritics Autochem II 2920, which is a fully-automated chemisorption analyzer that can be used to conduct an array of precise studies of chemical adsorption/desorption particularly with materials having surface-active metals. The active metal is reduced under hydrogen flow at elevated temperature and then measured amounts of carbon monoxide (CO) are dosed onto the surface until the surface is saturated with the CO molecules. The analysis is completed at a constant 35° C. The stoichiometric factor for CO adsorption onto precious metal surfaces must be known. For example, for Pt-based catalysts the stoichiometry for CO adsorption onto Pt is 1:1. Based on the total uptake of CO, the specific surface area of the active metal, the metal dispersion, and the active particle size can be calculated.

Temperature-programmed reaction—mass spectrometry data (TPRe-MS) are obtained by interfacing the Micromeritics Autochem II 2920 with a Pfeiffer Thermostar quadrupole mass spectrometer. A reactant gas mixture containing propane, propene, and oxygen in helium flows through a catalyst bed while the catalyst is heated from 40° C. to 450° C. at a rate of 3° C. per minute. Both the consumption of reactant molecules and the formation of reaction products are monitored with the mass spectrometer. The temperature at which 50% of the propane is converted is referred to as T50 and is a measure of the reactivity of the catalyst. Comparisons of T50's are used to rank the reactivity of materials.

Particle size distribution data are obtained by laser diffraction using a Honeywell X100 series Microtrac Particle Size Analyzer, which measures particle size distribution of powdered materials across a range of 0.12 to 704 microns (μm). With the aid of a surfactant, materials are dispersed in water and the resultant suspension is sonicated using a Branson sonic horn for a short period to homogeneously break down soft agglomerates. This suspension is then measured for particle size by laser light diffracting from the sample. This diffracted radiation is projected onto an optical detector array and an algorithm is used to calculate particle size distribution. The calculation assumes spherical shape and non-transparent particles.

Surface area and total pore volume are measured by nitrogen adsorption using a Micromeritics TriStar 3000 fully automated surface area and pore volume analyzer for powdered materials. The instrument is capable of measuring surface area as low as 5 $m^2/g$ and as high as 1000 $m^2/g$. The instrument uses physical adsorption and capillary condensation principles to determine the surface area and porosity of a solid material. At −273° C., the material is dosed with nitrogen at a series of precisely controlled pressures. With incremental pressure increases across the range of 0.01 to 0.3 P/Po, BET surface area is determined. At a pressure just below atmospheric pressure, the total nitrogen intrusion pore volume can be calculated.

EXAMPLE 1

150.3 g of tetra amine platinum (II) hydroxide solution (11.1 wt % Pt) and 227.5 g of tetra amine palladium (II) hydroxide solution (3.7 wt % Pd) are mixed with 475 g of fumed alumina and 5750 ml of water. All reagents are used as directly supplied from vendors. The combined mixture is sheared for about 40 minutes until the components are intimately mixed. The slurry is then introduced into a spray nozzle to generate an aerosol that is heated in a spray conversion reactor using air as the carrier gas. The spray conversion reactor is operated with an inlet temperature of 575° C. and an outlet temperature of 340° C. to produce a powder batch.

The theoretical composition of final powder is 5 wt % $Pt_{50}Pd_{50}$/alumina.

Figure 1:
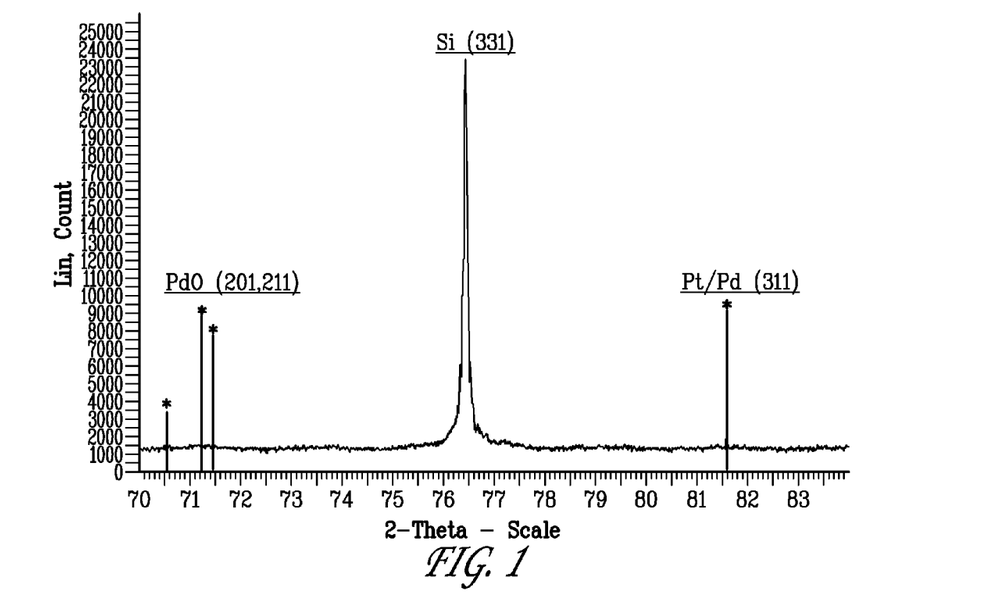
FIGS. 1 to 10 are X-ray diffraction patterns of the catalysts produced in Examples 1 to 10, respectively.

Following calcination in air at 500° C. for 2 hours, the product is characterized for its physical properties. The X-ray diffraction (XRD) pattern of the product (FIG. 1) is substantially free of the (311) diffraction peak assignable to $Pt_xP_{1-x}$, and (202, 211) diffraction peaks assignable to PdO.

Figure 11:
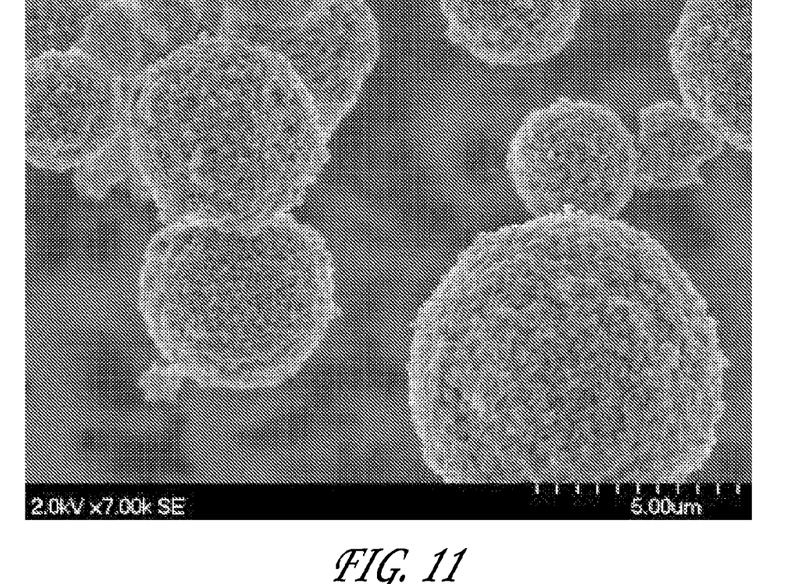
FIGS. 11 to 14 are scanning electron micrographs of the catalysts produced in Examples 1, 2, 4 to 11, respectively.

SEM analysis shows that the catalyst powder has spherical morphology with particle size in 5-10 μm range (FIG. 11).

Initial metal surface area of the product as measured by CO pulsed chemisorption is 100 $m^2/g$ metal.

To simulate aging of the product under conditions representative of those experienced in use as a diesel oxidation catalyst, the product is subject to the flowing aging protocol: a) load 2 g of catalyst powder in an alumina crucible and place in a box furnace, b) flow air in the furnace chamber at 100 ml/min, b) ramp the temperature up to 800° C. at 10° C./minute; c) hold at 800° C. for 16 hours, d) turn the heat off and let cool down to room temperature. The metal surface area of the aged product as measured by CO pulsed chemisorption is 22 $m^2/g$ metal.

EXAMPLE 2

144.5 g of tetra amine platinum (II) hydroxide solution (11.2 wt % Pt) and 239.8 g of tetra amine palladium (II) hydroxide solution (3.7 wt % Pd) are mixed with 475 g of gamma alumina and 5391 ml of water. All reagents are used as directly supplied from vendors. The combined mixture is sheared for about 40 minutes until the components are intimately mixed. The slurry is then introduced into a spray nozzle to generate an aerosol that is heated in a spray conversion reactor using air as the carrier gas. The spray conversion reactor is operated with an inlet temperature of 575° C. and an outlet temperature of 340° C. to produce a powder batch.

The theoretical composition of final powder is 5 wt % $Pt_{50}Pd_{50}$/alumina.

Figure 2:
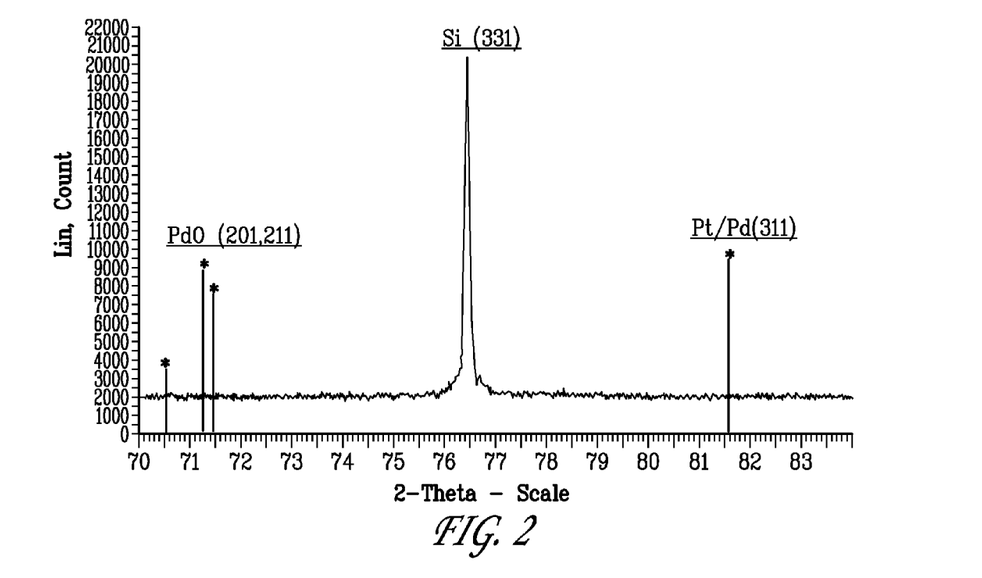

Following calcination in air at 500° C. for 2 hours, the catalyst is characterized for its physical properties. The X-ray diffraction (XRD) pattern of the powder (FIG. 2) is substantially free of the (311) diffraction peak assignable to $Pt_xPd_{1-x}$, and (202, 211) diffraction peaks assignable to PdO.

Figure 12:
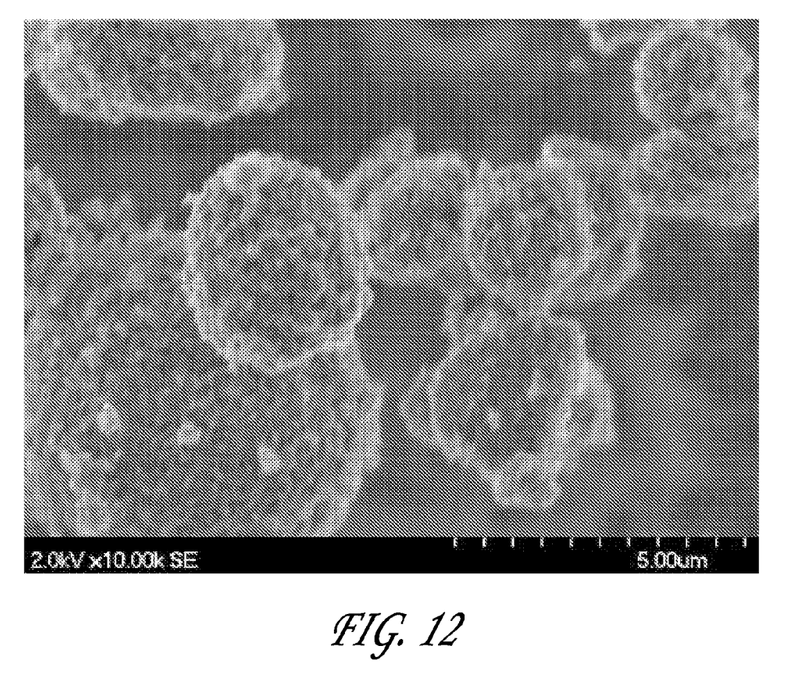

SEM analysis shows that the catalyst powder has spherical morphology with particle size in 5-10 μm range (FIG. 12).

Initial metal surface area as measured by CO pulsed chemisorption is 161 $m^2/g$ metal. Following aging in air at 800° C. for 16 hours as described in Example 1, the metal surface area as measured by CO pulsed chemisorption is 20 $m^2/g$ metal.

EXAMPLE 3

111.4 g of platinum (II) nitrate solution (14.5 wt % Pt) and 60.5 g of palladium (II) nitrate solution (14.5 wt % Pd) are mixed with 475 g of gamma alumina and 5603 ml of water. All reagents are used as directly supplied from vendors. The combined mixture is sheared for about 40 minutes until the components are intimately mixed. The slurry is then introduced into a spray nozzle to generate an aerosol that is heated in a spray conversion reactor using air as the carrier gas. The spray conversion reactor is operated with an inlet temperature of 575° C. and an outlet temperature of 340° C. to produce a powder batch.

The theoretical composition of final powder is 5 wt % $Pt_{50}Pd_{50}$/alumina.

Figure 3:
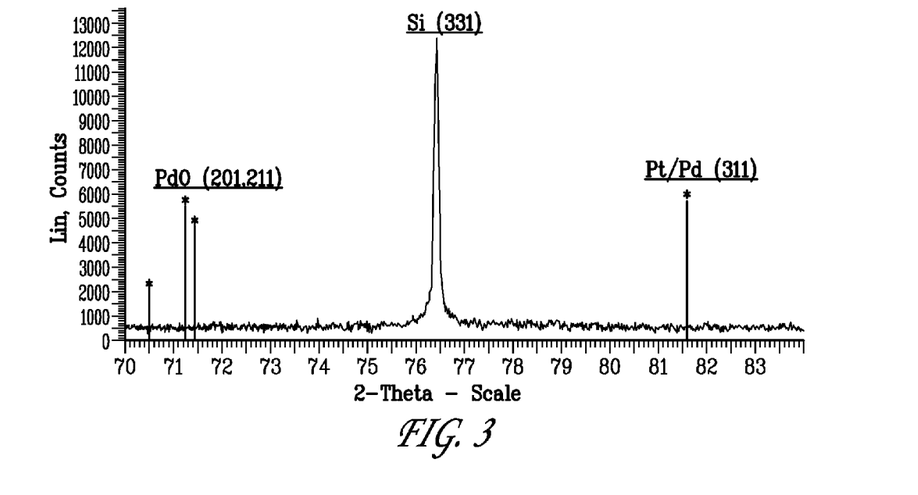

Following calcination in air at 500° C. for 2 hours, the catalyst is characterized for its physical properties. The X-ray diffraction (XRD) pattern of the powder (FIG. 3) is substantially free of the (311) diffraction peak assignable to $Pt_xPd_{1-x}$, and (202, 211) diffraction peaks assignable to PdO.

Metal surface area as measured by CO pulsed chemisorption is 168 $m^2/g$ metal.

EXAMPLE 4

A suspension of gamma alumina is produced using an Eiger Mini Mill (Eiger Machinery, Inc) such that the average particle size of the alumina after milling is about 1 μm. 63.6 g of tetra amine platinum (II) hydroxide solution (11.2 wt % Pt) and 105.6 g of tetra amine palladium (II) hydroxide solution (3.7 wt % Pd) are mixed with 1562 g of the milled alumina suspension (15.3 wt % alumina), 270 ml of 2 M nitric acid and 8000 ml of water. All reagents are used as directly supplied from vendors. The combined mixture is sheared for about 30 minutes until the components are intimately mixed. The slurry is atomized using an ultrasonic transducer at a frequency of about 1.6 MHZ to produce an aerosol of precursor droplets. Air is used as a carrier gas to move the aerosol through an elongated tubular furnace (72" length times 7.0" diameter) set at 700° C.

The theoretical composition of final powder is 5 wt % $Pt_{50}Pd_{50}$/alumina.

Figure 4:
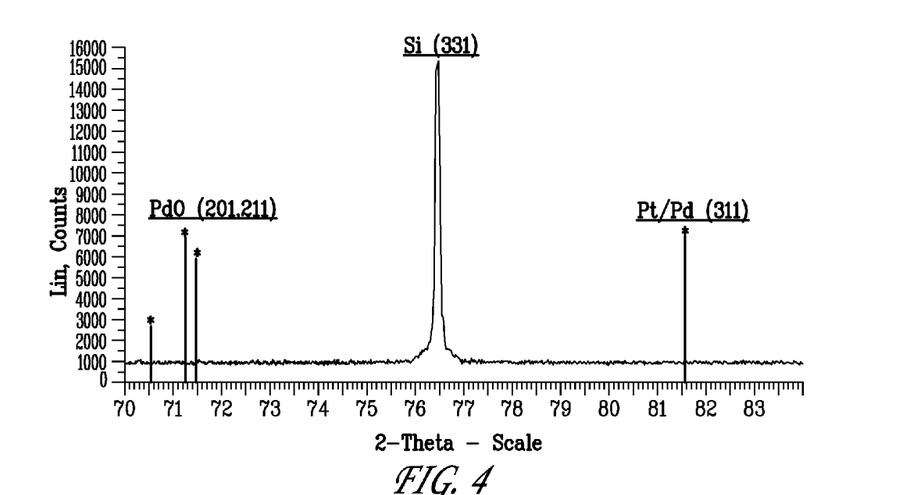

Following calcination in air at 500° C. for 2 hours, the catalyst is characterized for its physical properties. The X-ray diffraction (XRD) pattern of the powder (FIG. 4) is substantially free of the (311) diffraction peak assignable to $Pt_xPd_{1-x}$, and (202, 211) diffraction peaks assignable to PdO.

Figure 13:
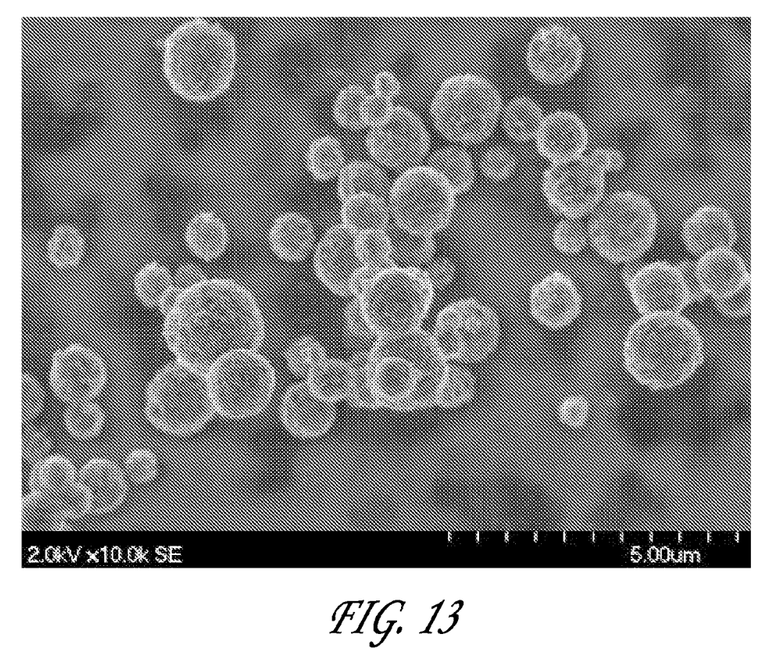

SEM analysis shows that the catalyst powder has spherical morphology with particle size in 1-2 μm range (FIG. 13).

Metal surface area as measured by CO pulsed chemisorption is 121 $m^2$/g metal.

EXAMPLE 5

A suspension of gamma alumina is produced using an Eiger Mini Mill (Eiger Machinery, Inc) such that the average particle size of the alumina after milling is about 1 μm. 38.3 g of platinum (II) nitrate solution (14.5 wt % Pt) and 20.8 g of palladium (II) nitrate solution (14.5 wt % Pd) are mixed with 1307 g of the milled alumina suspension (15.3 wt % alumina) and 6633 ml of water. All reagents are used as directly supplied from vendors. The combined mixture is sheared for about 30 minutes until the components are intimately mixed. The slurry is atomized using an ultrasonic transducers at a frequency of about 1.6 MHZ to produce an aerosol of precursor droplets. Air is used as a carrier gas to move the aerosol through an elongated tubular furnace (72" length times 7.0" diameter) set at 700° C.

The theoretical composition of final powder is 5 wt % $Pt_{50}Pd_{50}$/alumina.

Figure 5:
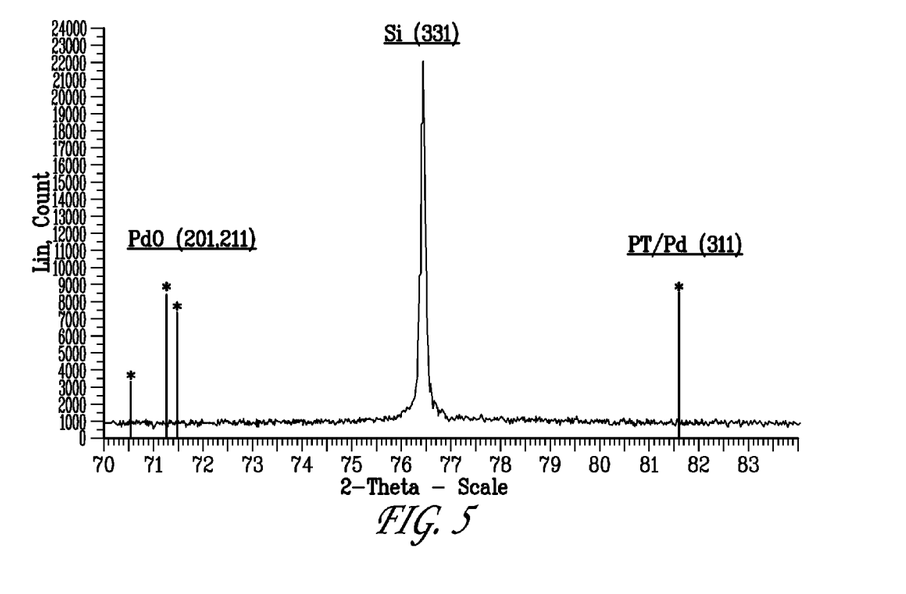

Following calcination in air at 500° C. for 2 hours, the catalyst is characterized for its physical properties. The X-ray diffraction (XRD) pattern of the powder (FIG. 5) is substantially free of the (311) diffraction peak assignable to $Pt_xPd_{1-x}$, and (202, 211) diffraction peaks assignable to PdO.

Metal surface area as measured by CO pulsed chemisorption is 176 $m^2$/g metal. Following aging in air at 800° C. for 16 hours as described in Example 1, the metal surface area as measured by CO pulsed chemisorption is 20 $m^2$/g metal.

EXAMPLE 6

A suspension of gamma alumina is produced using an Eiger Mini Mill (Eiger Machinery, Inc) such that the average particle size of the alumina after milling is about 1 μm. 46.7 g of tetra amine platinum (II) nitrate solution (5.2 wt % Pt) and 49.3 g of tetra amine palladium (II) nitrate solution (2.7 wt % Pd) were mixed with 600 g of the milled alumina suspension (11.9 wt % alumina) and 2304 ml of water. All reagents are used as directly supplied from vendors. The combined mixture is sheared for about 30 minutes until the components are intimately mixed. The pH of the mixture is then adjusted to 2.9 using 2 M nitric acid solution. The feed is atomized using ultrasonic transducers at a frequency of about 1.6 MHZ to produce an aerosol of precursor droplets. Air is used as a carrier gas to move the aerosol through an elongated tubular furnace (48" length times 3.25" diameter) set at 900° C.

The theoretical composition of final powder is 5 wt % $Pt_{50}Pd_{50}$/alumina.

Figure 6:
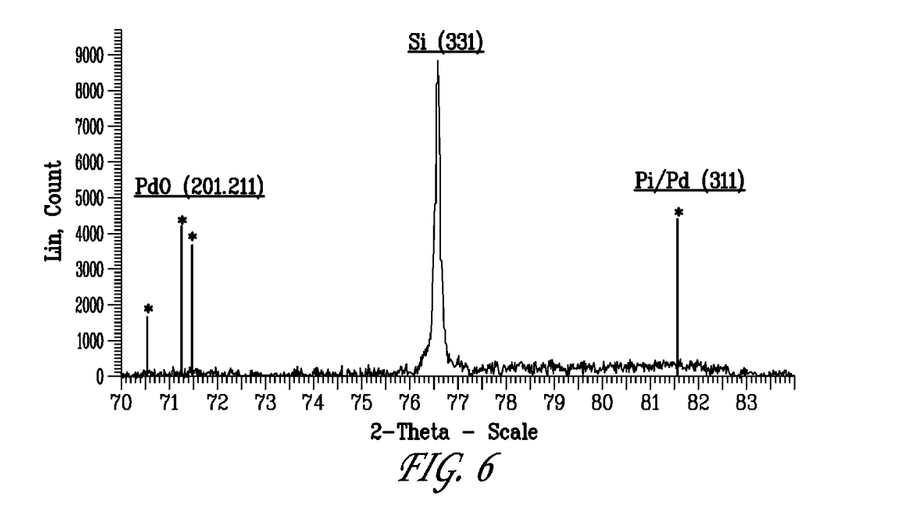

Following calcination in air at 500° C. for 2 hours, the catalyst is characterized for its physical properties. The X-ray diffraction (XRD) pattern of the powder (FIG. 6) is substantially free of the (311) diffraction peak assignable to $Pt_xPd_{1-x}$, and (202, 211) diffraction peaks assignable to PdO.

Metal surface area as measured by CO pulsed chemisorption is 103 $m^2$/g metal. Following aging in air at 800° C. for 16 hours as described in Example 1, the metal surface area as measured by CO pulsed chemisorption is 20 $m^2$/g metal.

EXAMPLE 7

A suspension of gamma alumina is produced using an Eiger Mini Mill (Eiger Machinery, Inc) such that the average particle size of the alumina after milling is about 1 μm. 14.4 g of tetra amine platinum (II) hydroxide solution (11.2 wt % Pt) and 24.0 g of tetra amine palladium (II) hydroxide solution (3.7 wt % Pd) were mixed with 416 g of the milled alumina suspension (11.4 wt % alumina) and 1546 ml of water. All reagents are used as directly supplied from vendors. The combined mixture is sheared for about 30 minutes until the components are intimately mixed. The feed is atomized using ultrasonic transducers at a frequency of about 1.6 MHZ to produce an aerosol of precursor droplets. Air is used as a carrier gas to move the aerosol through an elongated tubular furnace (48" length times 3.25" diameter) set at 750° C.

The theoretical composition of final powder is 5 wt % $Pt_{50}Pd_{50}$/alumina.

Figure 7:
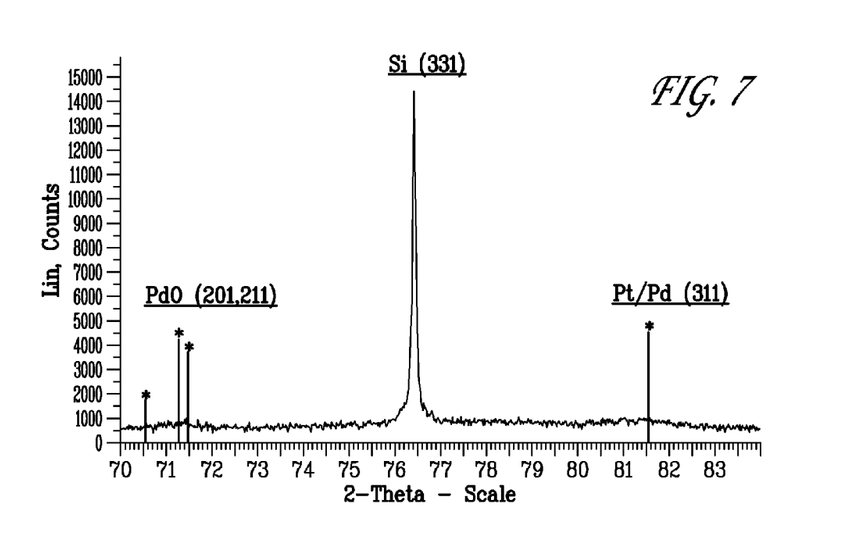

Following calcination in air at 500° C. for 2 hours, the catalyst is characterized for its physical properties. The X-ray diffraction (XRD) pattern of the powder (FIG. 7) is substantially free of the (311) diffraction peak assignable to $Pt_xPd_{1-x}$, and (202, 211) diffraction peaks assignable to PdO.

Metal surface area as measured by CO pulsed chemisorption is 151 $m^2$/g metal. Following aging in air at 800° C. for 16 hours as described in Example 1, the metal surface area as measured by CO pulsed chemisorption is 23 $m^2$/g metal.

Example 8 (Comparative)

34.5 g of tetra amine platinum (II) nitrate solution (4.83 wt % Pt) and 12.6 g of tetra amine palladium (II) nitrate solution (6.64 wt % Pd) are mixed with 47.4 g of fumed alumina. All reagents are used as directly supplied from vendors. The combined mixture is stirred for about 30 minutes until the components are intimately mixed. The paste-like slurry is then let to dry in air overnight, calcined at 350° C. for 2 hours and at 500° C. for 2 hours and characterized for its physical properties.

The theoretical composition of final powder is 5 wt % $Pt_{50}Pd_{50}$/alumina.

Figure 8:
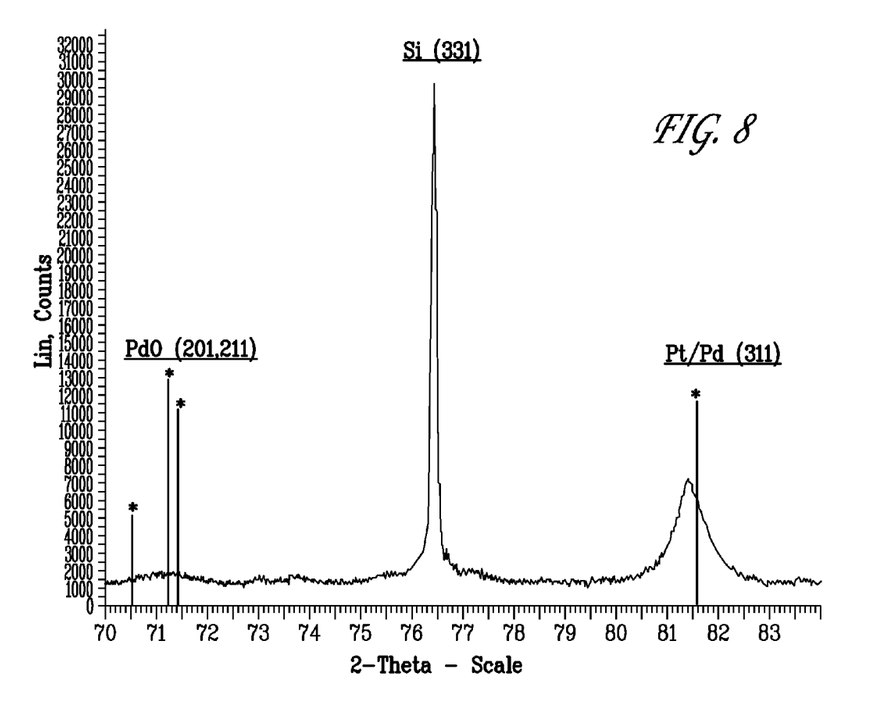

The X-ray diffraction (XRD) pattern of the powder (FIG. 8) shows (311) diffraction peak assignable to $Pt_xPd_{1-x}$, and (202, 211) diffraction peaks assignable to PdO of measurable intensities, i.e. $I(Pt_xPd_{1-x}):I(Si)=1.33$ and $I(PdO):I(Si)=0.18$.

Metal surface area as measured by CO pulsed chemisorption is 54 $m^2$/g metal. Following aging in air at 800° C. for 16 hours as described in Example 1, the metal surface area as measured by CO pulsed chemisorption is 12 $m^2$/g metal.

EXAMPLE 9 (COMPARATIVE)

15.0 g of tetra amine platinum (II) hydroxide solution (11.1 wt % Pt) and 22.8 g of tetra amine palladium (II) hydroxide solution (3.7 wt % Pd) were mixed with 47.4 g of fumed alumina. All reagents are used as directly supplied from vendors. The combined mixture is stirred for about 30 minutes until the components are intimately mixed. The paste-like slurry is then let to dry in air overnight, calcined at 350° C. for 2 hours and at 500° C. for 2 hours and characterized for its physical properties.

The theoretical composition of final powder is 5 wt % $Pt_{50}Pd_{50}$/alumina.

Figure 9:
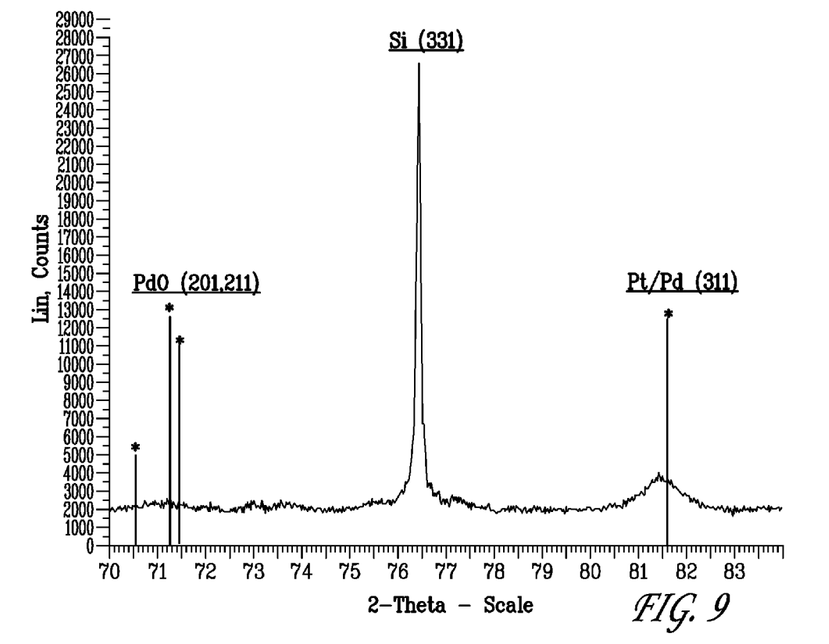

The X-ray diffraction (XRD) pattern of the powder (FIG. 9) shows (311) diffraction peak assignable to $Pt_xPd_{1-x}$ measurable intensity, i.e. $I(Pt_xPd_{1-x}):I(Si)=0.55$.

Metal surface area as measured by CO pulsed chemisorption is 82 $m^2$/g metal. Following aging in air at 800° C. for 16 hours as described in Example 1, the metal surface area as measured by CO pulsed chemisorption is 15 $m^2$/g metal.

EXAMPLE 10 (COMPARATIVE)

34.5 g of tetra amine platinum (II) nitrate solution (4.83 wt % Pt) and 12.6 g of tetra amine palladium (II) nitrate solution (6.64 wt % Pd) are mixed with 47.4 g of precipitated alumina. All reagents are used as directly supplied from vendors. The combined mixture is stirred for about 30 minutes until the components are intimately mixed. The paste-like slurry is then let to dry in air overnight, calcined at 350° C. for 2 hours and at 500° C. for 2 hours and characterized for its physical properties.

The theoretical composition of final powder is 5 wt % $Pt_{50}Pd_{50}$/alumina.

Figure 10:
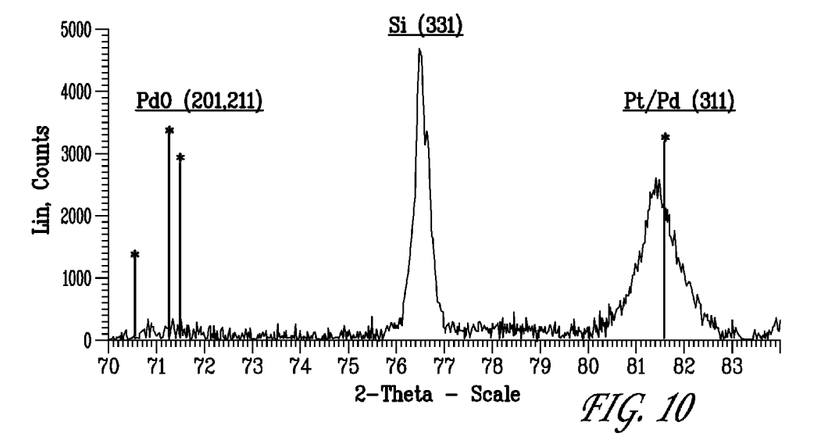

The X-ray diffraction (XRD) pattern of the powder (FIG. 10) shows (311) diffraction peak assignable to $Pt_xPd_{1-x}$ measurable intensity, i.e. $I(Pt_xPd_{1-x}):I(Si)=1.47$.

Metal surface area as measured by CO pulsed chemisorption is 95 $m^2$/g metal. Following aging in air at 800° C. for 16 hours as described in Example 1, the metal surface area as measured by CO pulsed chemisorption is 14 $m^2$/g metal.

EXAMPLE 11

21.7 g of tetra amine platinum (II) hydroxide solution (11.2 wt % Pt) and 36.0 g of tetra amine palladium (II) hydroxide solution (3.7 wt % Pd) are mixed with 71.3 g of fumed alumina and 2871 ml of water. All reagents are used as directly supplied from vendors. The combined mixture is sheared for about 30 minutes until the components are intimately mixed. The feed is atomized using ultrasonic transducers at a frequency of about 1.6 MHZ to produce an aerosol of precursor droplets. Air is used as a carrier gas to move the aerosol through an elongated tubular furnace (48" length times 3.25" diameter) set at 600° C.

The theoretical composition of final powder is 5 wt % $Pt_{50}Pd_{50}$/alumina.

Figure 14:
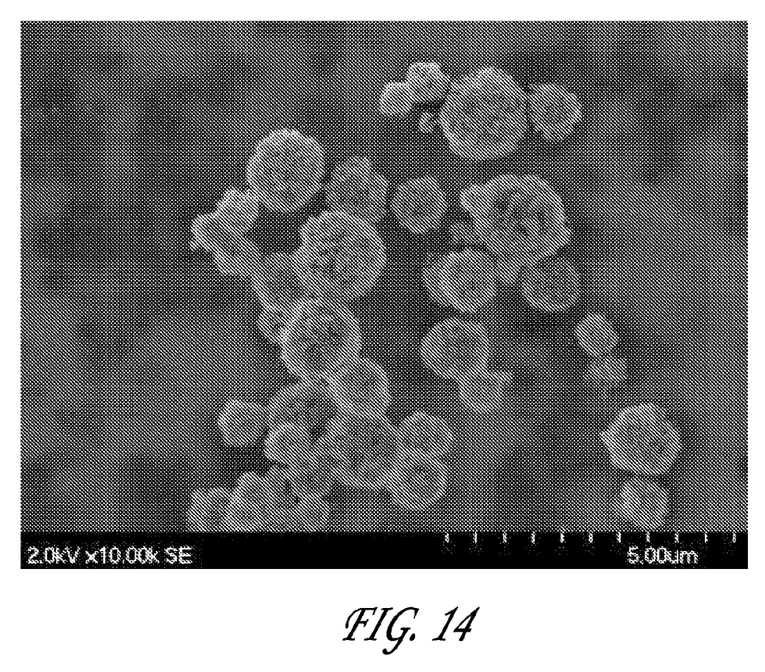
Figure 15:
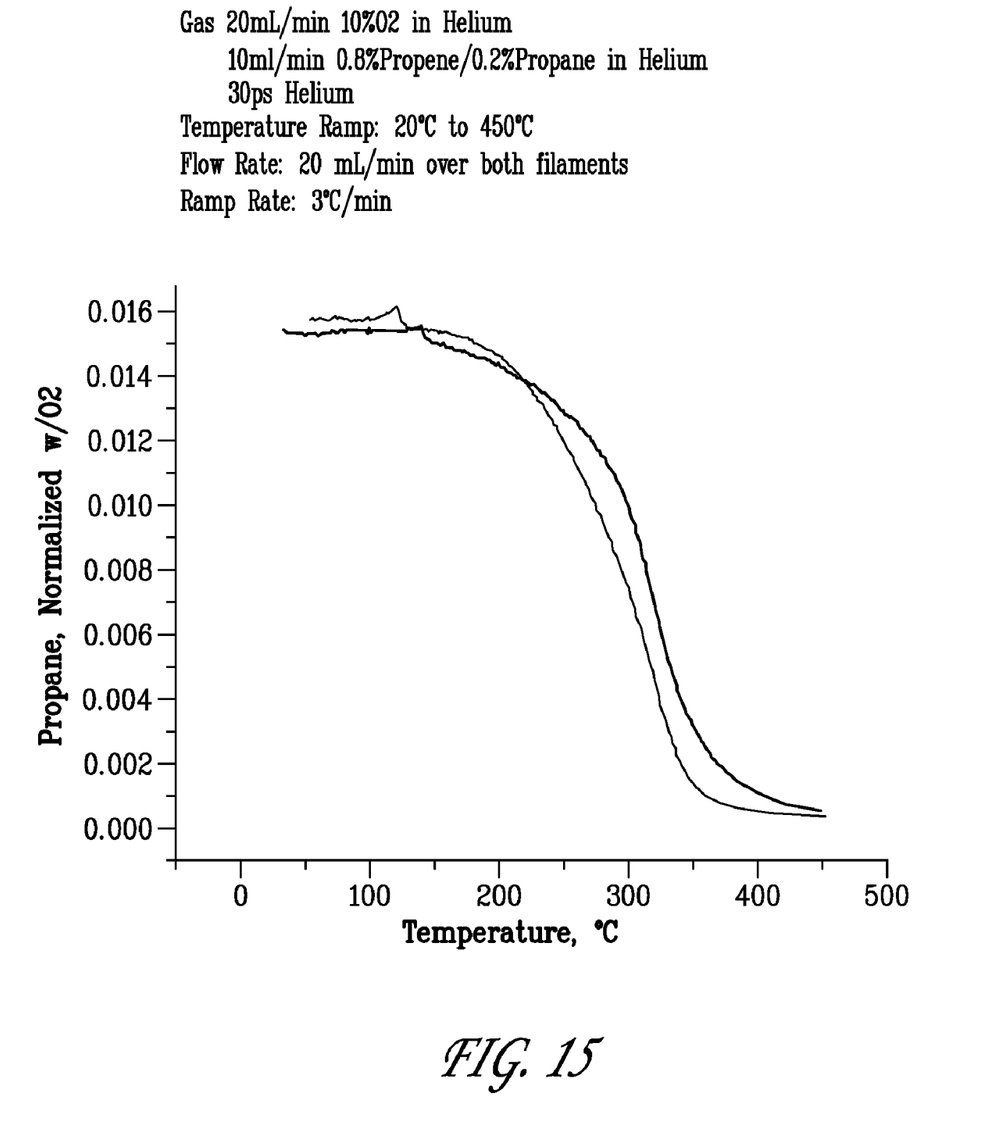
FIG. 15 is a graph of propane conversion against temperature for the catalysts of Examples 6 and 10.

SEM analysis shows that the catalyst powder has spherical morphology with particle size in 1-2 μm range (FIG. 14).

Following calcination in air at 500° C. for 2 hr, the catalyst was characterized for its physical properties.

Metal surface area as measured with CO pulsed chemisorption is 127 $m^2$/g metal. Following aging in air at 800° C. for 16 hours as described in Example 1, the metal surface area as measured by CO pulsed chemisorption is 27 $m^2$/g metal.

EXAMPLE 12

21.7 g of tetra amine platinum (II) hydroxide solution (11.2 wt % Pt) and 36.0 g of tetra amine palladium (II) hydroxide solution (3.7 wt % Pd) are mixed with 71.3 g of fumed alumina and 2871 ml of water. All reagents are used as directly supplied from vendors. The combined mixture is sheared for about 30 minutes until the components are intimately mixed. The feed is atomized using ultrasonic transducers at a frequency of about 1.6 MHZ to produce an aerosol of precursor droplets. Air is used as a carrier gas to move the aerosol through an elongated tubular furnace (48" length times 3.25" diameter) set at 750° C.

The theoretical composition of final powder is 5 wt % $Pt_{50}Pd_{50}$/alumina.

Following calcination in air at 500° C. for 2 hr, the catalyst was characterized for its physical properties.

Metal surface area as measured with CO pulsed chemisorption is 101 $m^2$/g metal. Following aging in air at 800° C. for 16 hours as described in Example 1, the metal surface area as measured by CO pulsed chemisorption is 20 $m^2$/g metal.

EXAMPLE 13

24.9 g of tetra amine platinum (II) nitrate solution (5.2 wt % Pt) and 26.3 g of tetra amine palladium (II) nitrate solution (2.7 wt % Pd) are mixed with 38 g of fumed alumina and 1549 ml of water. All reagents are used as directly supplied from vendors. The combined mixture is sheared for about 30 minutes until the components are intimately mixed. The feed is atomized using ultrasonic transducers at a frequency of about 1.6 MHZ to produce an aerosol of precursor droplets. Air is used as a carrier gas to move the aerosol through an elongated tubular furnace (48" length times 3.25" diameter) set at 900° C.

The theoretical composition of final powder is 5 wt % $Pt_{50}Pd_{50}$/alumina.

Following calcination in air at 500° C. for 2 hr, the catalyst was characterized for its physical properties.

Metal surface area as measured with CO pulsed chemisorption is 117 $m^2$/g metal. Following aging in air at 800° C. for 16 hours as described in Example 1, the metal surface area as measured by CO pulsed chemisorption is 23 $m^2$/g metal.

EXAMPLE 14

150.3 g of tetra amine platinum (II) hydroxide solution (11.1 wt % Pt) and 227.5 g of tetra amine palladium (II) hydroxide solution (3.7 wt % Pd) are mixed with 475 g of fumed alumina and 5750 ml of water. All reagents are used as directly supplied from vendors. The combined mixture is sheared for about 40 minutes until the components are intimately mixed. The slurry is then introduced into a spray nozzle to generate an aerosol that is heated in a spray conversion reactor using air as the carrier gas. The spray conversion reactor is operated with an inlet temperature of 575° C. and an outlet temperature of 340° C. to produce a powder batch.

The theoretical composition of final powder is 5 wt % $Pt_{50}Pd_{50}$/alumina.

The catalyst is post-treated for 2 hrs at 500° C. in 5% $H_2$/95% $N_2$ gas mixture as follows: a) $N_2$ purge of the reactor housing the catalyst at room temperature (30° C.) for 30 minutes; b) ramp the temperature up to 300° C. in $N_2$ at 5° C./minute; c) further ramp the temperature up to 400° C. in $N_2$ at 3° C./minutes, d) further ramp the temperature up to 500° C. in $N_2$ at 1° C./minute; e) switch to mixture of 5 vol. % $H_2$ and 95 vol. % $N_2$, and maintain at 500° C. for 2 hours; f) switch back to $N_2$, cool reactor down to room temperature at 3° C./minute before collection of the catalyst.

Following calcination in air at 500° C. for 2 hours, the catalyst is characterized for its physical properties. Metal surface area as measured with CO pulsed chemisorption is 102 $m^2$/g metal. Following aging in air at 800° C. for 16 hours as described in Example 1, the metal surface area as measured by CO pulsed chemisorption is 28 $m^2$/g metal.

EXAMPLE 15

In this Example, the propane conversion performance after aging for the catalyst of Example 6 was compared with that for the catalyst of Example 10 and the results are plotted in FIG. 16. The T50 (temperature for the 50% conversion) for the conversion of propane is achieved at a temperature of 293° C. with the catalyst of Example 6, whereas the T50 for the conversion of propane for the conventional catalyst of Example 10 requires a temperature of 313° C., demonstrating the increased activity for the catalyst of Example 6.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A catalyst composition comprising support particles; and catalyst nanoparticles on the support particles, the catalyst nanoparticles comprising an alloy of platinum and palladium in an atomic ratio of from about 25:75 to about 75:25 and being in a concentration of between about 3 and about 10 wt. % weight percent of the catalyst composition, and the catalyst composition having an X-ray diffraction pattern that is substantially free of the (311) diffraction peak assignable to $Pt_xPd_{1-x}$, where $0.25 \leq x \leq 0.75$.

2. The catalyst composition of claim 1 and having an X-Ray diffraction pattern that is substantially free of the (202, 211) diffraction peaks assignable to PdO.

3. The catalyst composition of claim 1, wherein the surface area of the catalyst particles as measured by CO pulsed chemisorption is greater then 100 $m^2/g$ of the platinum and palladium in said catalytic particles.

4. The catalyst composition of claim 1, wherein the support particles have an average diameter, d50, of less than 100 microns.

5. The catalyst composition of claim 1, wherein the support particles are formed of a refractory inorganic oxide material.

6. The catalyst composition of claim 1, wherein the support particles comprise at least one alumina, ceria, zirconia, and magnesia.

7. The catalyst composition of claim 1, wherein the support particles are formed of alumina and have a surface area (BET) in the range of about 50 to about 350 $m^2/g$.

8. A catalyst composition comprising support particles; and catalyst nanoparticles on the support particles, the catalyst nanoparticles comprising platinum and palladium in an atomic ratio of from approximately 25:75 to approximately 75:25 and being in a concentration of approximately 5 and 10 weight percent of the composition, and the catalyst composition having a metal surface area as measured with CO pulsed chemisorption of at least 100 $m^2/g$ of the platinum and palladium in the catalyst composition.

9. The catalyst composition of claim 8, wherein the surface area of the catalyst particles as measured by CO pulsed chemisorption is at least 110 $m^2/g$ of the platinum and palladium in said catalytic particles.

10. The catalyst composition of claim 8, wherein the support particles have an average diameter, d50, of less than 100 microns.

11. The catalyst composition of claim 8, wherein the support particles are formed of a refractory inorganic oxide material.

12. The catalyst composition of claim 8, wherein the support particles comprise at least one alumina, ceria, zirconia, and magnesia.

13. The catalyst composition of claim 8, wherein the support particles are formed of alumina and have a surface area (BET) in the range of about 50 to about 350 $m^2/g$.

14. A catalyst composition comprising support particles; and catalyst nanoparticles on the support particles, the catalyst nanoparticles comprising platinum and palladium in an atomic ratio of from approximately 25:75 to approximately 75:25 and being in a concentration of approximately 5 and 10 weight percent of the composition, wherein the catalyst composition, after being heated in air flowing at 100 ml/min from 25° C. to 800° C. at 10° C./minute and then held at 800° C. for 16 hours in said flowing air, exhibits a metal surface area as measured with CO pulsed chemisorption of at least 18 $m^2/g$ of the platinum and palladium in the catalyst composition.

15. The catalyst composition of claim 14 wherein, after being heated in air flowing at 100 ml/min from 25° C. to 800° C. at 10° C./minute and then held at 800° C. for 16 hours in said flowing air, the catalyst composition exhibits a metal surface area as measured with CO pulsed chemisorption of at least 20 $m^2/g$ of the platinum and palladium in the catalyst composition.

16. The catalyst composition of claim 14 wherein, prior to said heating, the catalyst composition exhibits a metal surface area as measured with CO pulsed chemisorption of at least 100 $m^2/g$ of the platinum and palladium in the catalyst composition.

17. The catalyst composition of claim 14, wherein the support particles have an average diameter, d50, of less than 100 microns.

18. The catalyst composition of claim 14, wherein the support particles are formed of a refractory inorganic oxide material.

19. The catalyst composition of claim 14, wherein the support particles comprise at least one alumina, ceria, zirconia, and magnesia.

20. The catalyst composition of claim 14, wherein the support particles are formed of alumina and have a surface area (BET) in the range of about 50 to about 350 $m^2/g$.

21. A process for producing a catalyst composition, the process comprising:
(a) providing a precursor medium comprising a liquid vehicle containing particles of a refractory oxide support, and one or more precursors to elemental platinum and elemental palladium in an atomic ratio of from about 25:75 to about 75:25;
(b) forming an aerosol comprising droplets of said precursor medium; and
(c) heating said droplets to remove said liquid vehicle and chemically convert said one or more precursors to catalyst nanoparticles comprising an alloy of platinum and palladium on said support particles,
wherein the composition of the precursor medium is such that the catalytic particles are in a concentration of between about 3 and about 10 wt. % weight percent of the catalyst composition and the atomic ratio of platinum to palladium in the catalytic particles is from about 25:75 to about 75:25.

22. The process of claim 21 wherein the heating (c) is conducted at a temperature of from about 300 to about 3000° C.

23. The process of claim 21 wherein the heating (c) is conducted at a temperature of from about 300 to about 600° C. for a time of about 10 to about 60 seconds.

24. The process of claim 21 wherein the heating (c) is conducted at a temperature of from about 600 to about 1100° C. for a time of about 1 to about 10 seconds.

25. The process of claim 21 wherein the heating (c) is conducted at a temperature of from about 1100 to about 3000° C. for a time of about 0.01 to about 1 second.

26. The process of claim 21 wherein the support particles present in the precursor medium have an average diameter, d50, of about 0.1 to about 1 micron.

27. The process of claim 21 and further comprising:
(d) heating the supported catalyst nanoparticles produced in (c) to assist in alloying the platinum and palladium in said nanoparticles.

28. The process of claim 27, wherein the heating (d) is conducted at a temperature of about 300° C. to about 800° C. for a time of about 1 to about 12 hours.

29. The process of claim 21 wherein the support particles comprise at least one alumina, ceria, zirconia, and magnesia.

* * * * *